(12) United States Patent
Strothmann

(10) Patent No.: US 6,545,437 B1
(45) Date of Patent: Apr. 8, 2003

(54) CONTROL FOR A MUSCLE OR MOTOR-POWERED DRIVE

(76) Inventor: Rolf Strothmann, Kobenhüttenweg 49, D-66123 Saarbrücken (DE)

( * ) Notice: Subject to any disclaimer, the term of this patent is extended or adjusted under 35 U.S.C. 154(b) by 0 days.

(21) Appl. No.: 09/581,278
(22) PCT Filed: Nov. 25, 1998
(86) PCT No.: PCT/EP98/07587
§ 371 (c)(1), (2), (4) Date: Jun. 9, 2000
(87) PCT Pub. No.: WO99/30959
PCT Pub. Date: Jun. 24, 1999

(30) Foreign Application Priority Data

Dec. 12, 1997 (DE) .......................... 197 55 309

(51) Int. Cl.⁷ ............................. H02P 1/00; H02P 3/00; H02P 5/00
(52) U.S. Cl. .................... 318/139; 318/599; 318/430; 180/205; 180/206
(58) Field of Search .................. 318/139, 599, 318/430–434; 180/206, 205, 65.2, 207, 220

(56) References Cited

U.S. PATENT DOCUMENTS

| | | | |
|---|---|---|---|
| 5,505,277 A | * 4/1996 | Suganuma et al. | 180/206 |
| 5,664,636 A | 9/1997 | Ikuma et al. | 180/206 |
| 5,749,429 A | * 5/1998 | Yamauchi et al. | 180/205 |
| 5,777,442 A | * 7/1998 | Miyata | 318/2 |
| 5,857,537 A | * 1/1999 | Matsumoto et al. | 180/206 |
| 5,910,714 A | * 6/1999 | Buchanan et al. | 318/139 |
| 5,924,511 A | * 7/1999 | Takata | 180/205 |
| 5,984,038 A | * 11/1999 | Fujiwara et al. | 180/206 |
| 6,015,021 A | * 1/2000 | Tanaka et al. | 180/206 |
| 6,152,250 A | * 11/2000 | Shu-Hsien | 180/220 |

FOREIGN PATENT DOCUMENTS

| | | | | |
|---|---|---|---|---|
| DE | 197 32 430 A1 | * 2/1999 | | B62M/23/02 |
| EP | 0734945 | 10/1996 | | |
| EP | 0 798 205 A2 | * 10/1997 | | B62M/23/02 |
| WO | 9503096 | 2/1995 | | |
| WO | 9632314 | 10/1996 | | |

* cited by examiner

Primary Examiner—Shih-Yung Hsieh
Assistant Examiner—Edgardo San Martin
(74) Attorney, Agent, or Firm—Friedrich Kueffner

(57) ABSTRACT

A control for a motor drive of a device that is movable, in particular, drivable, by a muscle power drive as well as, in a supporting function, the motor drive, including an apparatus, detecting kinematic parameters of the moving device and generating motor drive control signals, for adjusting a degree of support action for the muscle power drive by means of the motor drive based exclusively on the detected kinematic parameters, wherein the kinematic parameters relate to a movement component which is based on at least one of the periodic fluctuation of the exerted muscle driving power inherent in the muscle power drive and a change of the exerted muscle driving power in reaction to a certain change of the motor driving power or the motor driving speed.

11 Claims, 5 Drawing Sheets

CONTROL FOR A MUSCLE OR MOTOR-POWERED DRIVE

BACKGROUND OF THE INVENTION

1. Field of the Invention

The invention relates to a control for a motor drive of a device that is movable, in particular, drivable, by muscle power as well as, in a supporting function, by the motor drive, comprising an apparatus, detecting kinematic parameters of the moving device and generating motor drive control signals, for adjusting a degree of support action for the muscle power drive by means of the motor drive based exclusively on the detected kinematic parameters.

2. Description of the Related Art

Drives which are based on muscle power as well as motor power are known from drivable devices, such as bicycles or golf carts. In this connection, the motor drive has a supporting function in that it provides, for example, a portion of the total required driving power which surpasses a basic load to be provided by muscle power. The total required driving power results from the behavior of the user of the drivable device who, for example, wants to accelerate or/and maintain a certain speed under the different drive path conditions that are characterized by different inclines or the ground conditions.

A control, known from WO 05/03096, for a drive based on muscle power as well as motor power for a drivable device is based on a continuous measurement of the applied muscle driving power and a control of the measured driving power to a predetermined value. In the context of this control, the drivable device is adjusted by the motor driving power such that the user feels a constant drive resistance corresponding to this value and, thus, to the basic load.

U.S. Pat. No. 5,664,636 describes a control for an electric auxiliary drive of a pedal-driven vehicle in which the aforementioned apparatus for generating motor drive control signals detects, in addition to the speed of the vehicle, continuously the pedal power. The support action by means of the auxiliary drive is adjusted by means of a stored reference table in which desired driving powers correlated to the driving speed and the pedal power are stored.

Controls of the aforementioned kind in which the generation of motor drive control signals is carried out exclusively by means of the detected kinematic parameters are disclosed in EP 0 734 945 A1 as well as WO 96/32314. The control known from EP 0 734 945 A1 for a motor drive of a bicycle comprises an acceleration sensor which can be embodied by a speed sensor and a differential device. Based on the determined acceleration values, motor drive control signals are generated which provide for a change of the drive support action by the motor drive so that the pedal driving power required during the time period of acceleration of the bicycle is accordingly reduced. For changing the drive support action, the switching ratio of the drive motor operated with pulse width modulation is varied. In the control known from WO 96/32314 the speed of the vehicle driven by muscle and motor driving power is continuously determined and the motor driving power is adjusted according to a stored functional relation between the motor driving power and the speed of the vehicle.

SUMMARY OF THE INVENTION

With the present invention, a new control of the aforementioned kind is provided in which the aforementioned kinematic parameters relate to a movement component which is based on the periodic fluctuation of the exerted muscle driving power inherent in the muscle power drive or/and a change of the exerted muscle driving power in reaction to a certain change of the motor driving power or the motor driving speed.

Preferably, the aforementioned apparatus is designed for generating motor driving power control signals according to a desired support or relief of the muscle power drive by means of the motor power drive, wherein the support action can be realized according to a desired proportion of motor power relative to the total driving power or according to an optionally adjustable constant basic load to be provided by the muscle power drive.

In a preferred embodiment of the invention the aforementioned apparatus is designed for determining and evaluating time functions of kinematic parameters and comprises especially an analytical device comprising a differential device for evaluating the time functions. According to this embodiment, a device for detecting travel-time-functions or speed-time-functions could be provided wherein optionally acceleration-time-functions and time functions of higher derivatives can be formed with the aid of the differential device.

The muscle power drive may be, for example, the pedal drive of a bicycle in which a circular drive motion results by actuation of the pedal crank device. According to the conditions of the muscle power generation and transmission in such a drive, the driving power that can be transmitted onto the pedals fluctuates for such a drive such that the driving power has a minimum in the vertical position of the pedal crank and has a maximum in the horizontal position of the pedal crank. According to this fluctuating driving power, the acceleration or/and speed profile of the bicycle powered by a muscle power drive has a periodic component. The amplitudes of the periodic components depend on the average pedaling force.

Such a periodic component also results for a muscle power drive in which a running movement is realized by exerting a pulling or pushing force transmitted, for example, onto a drivable device. According to the power generating and transmission conditions changing with the running movement, a periodic increase and decrease of the pulling or pushing force results, wherein these fluctuations are the greater, because of the increasingly stronger coupling action via the muscle tension, the greater the transmitted average pulling or pushing force.

For generating control signals, the aforementioned apparatus can evaluate the amplitudes of the periodic components of the speed or/and acceleration profiles wherein an average speed or/and acceleration overlaying the periodic component can be taking into account. In this evaluation, the amplitudes are preferably compared to a predetermined stored amplitude wherein the stored amplitude can be selected according to a basic load to be supplied by the muscle power drive.

Inasmuch as the signal generation is carried out with the goal that a certain basic load is to be provided by muscle power, the control signal generation by the aforementioned apparatus can be performed by controlling the amplitude of the periodic component of the detected speed profile to the predetermined amplitude.

In a further embodiment of the invention, the determination of kinematic parameters is based on a predetermined model of the drive behavior of a user of the device who supplies the muscle power. Such a behavior model can be, for example, typical drive movements for certain drive situations, for example, the initial muscle-powered movement when starting to drive the drivable device. In reaction to such an initial driving movement, which can be determined by comparison with correspondingly stored movement courses, control signals for a suitable activation of the motor drive can be generated.

The behavior model is a reaction model which results from certain changes of the drive action by the motor drive, wherein the predetermined changes of the drive, for example, may reside in the slow increase or decrease of the motor driving power or driving speed and wherein the aforementioned apparatus is designed for switching from increase to decrease of the motor driving power or speed when the movement of the driven device decelerates and for switching from decrease to increase when the movement of the driven device accelerates. Such a control is based on the idea that, when, for example, the motor driving power increases, the user is reducing the muscle power correspondingly for the time period for which he desires a support by the motor drive. When the user no longer reduces the muscle driving power to the degree in which the motor driving power increases, an acceleration is caused, and form this it can be deduced that the user finds this motor driving power, that has increased up to the point of acceleration, desirable. In the reverse situation, when the motor driving power decreases slowly, a negative acceleration of the drivable device results when the user no longer increases the muscle driving power accordingly, and, based on this, the aforementioned apparatus can determining that the motor driving power reached at the point where the negative acceleration occurs is the desired motor driving power. In this way, the driving support action desired by the user of the drivable device will be automatically adjusted.

BRIEF DESCRIPTION OF THE DRAWING

The invention will now be explained and described in more detail with the aid of embodiments and the attached drawings which relate to these embodiments. It is shown in.

DETAILED DESCRIPTION OF THE PREFERRED EMBODIMENTS

Figure 1:
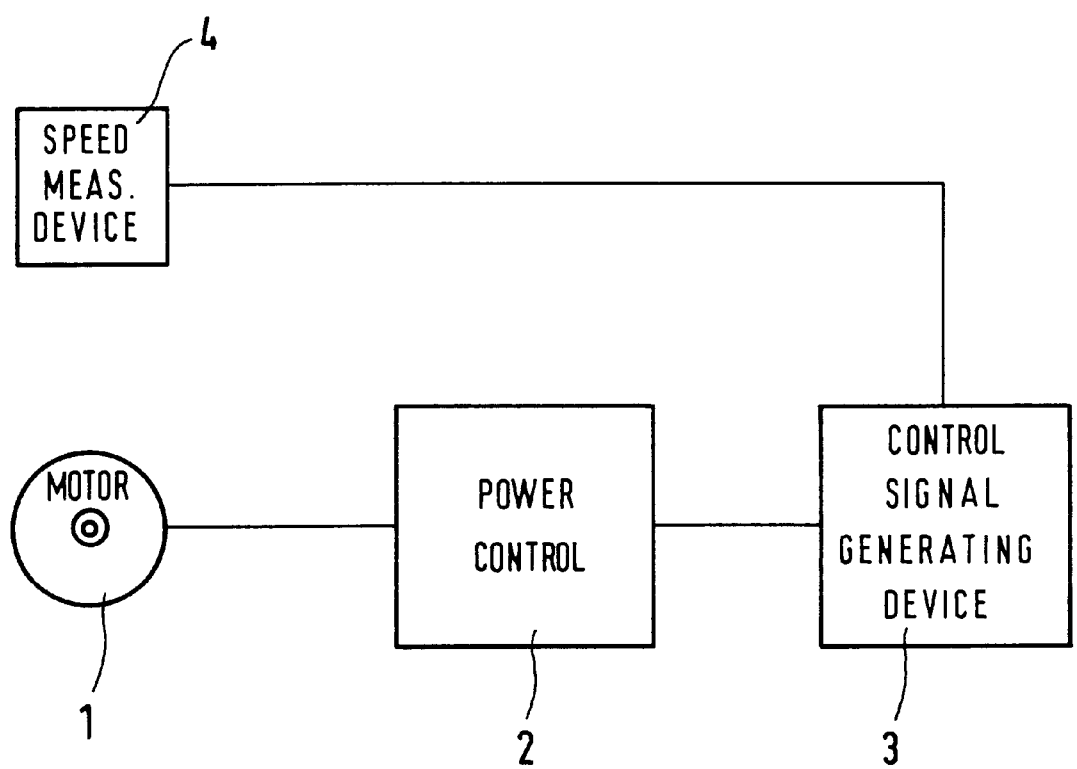
FIG. 1 a schematic representation of the control according to the invention.

In FIG. 1, the reference numeral 1 refers to a drive motor of a drivable device, not shown, for example, a bicycle or a golf cart. The motor 1 is supplied by a power control 2 comprising a battery and receiving control signals generated by the device 3. The control signal generating device 3 is connected to the speed measuring device 4.

The speed measuring device 4 comprises in the shown embodiment a pulse generator detecting positional changes of the drivable device and generating pulses in a number proportional to the rotational angle of the shaft of the drive motor 1. The speed measuring device 4 comprises moreover a time measuring device and a computing device in order to compute, based on the measured pulse numbers and times, the rotational speed of the drive shaft which is proportional to the translatory speed of the aforementioned drivable device. The time measuring device and the computing device as well as the control signal generating device 3 are implemented by a computer wherein the control signal generating device can also detect and evaluate directly positional changes of the drivable device via the pulse generator.

The drive motor 1 is a separately excited multi-pole three phase current synchronous motor which is star-connected. This motor may itself serve as a pulse generator of the speed measuring device 4, wherein, for example, corresponding voltage pulses, formed by induction on the excitation poles, can be tapped at the star point. Reference is now being had to FIG. 2, wherein speed profiles of a bicycle or a device which is pushed or pulled by a person, for example, a golf cart, are shown in partial Figure a. In the shown example, the speed profiles have a constant speed component $X_k$ which is overlaid by a periodic component. This means that the drivable device is moving with a constant average speed $X_k$.

Figure 2A:
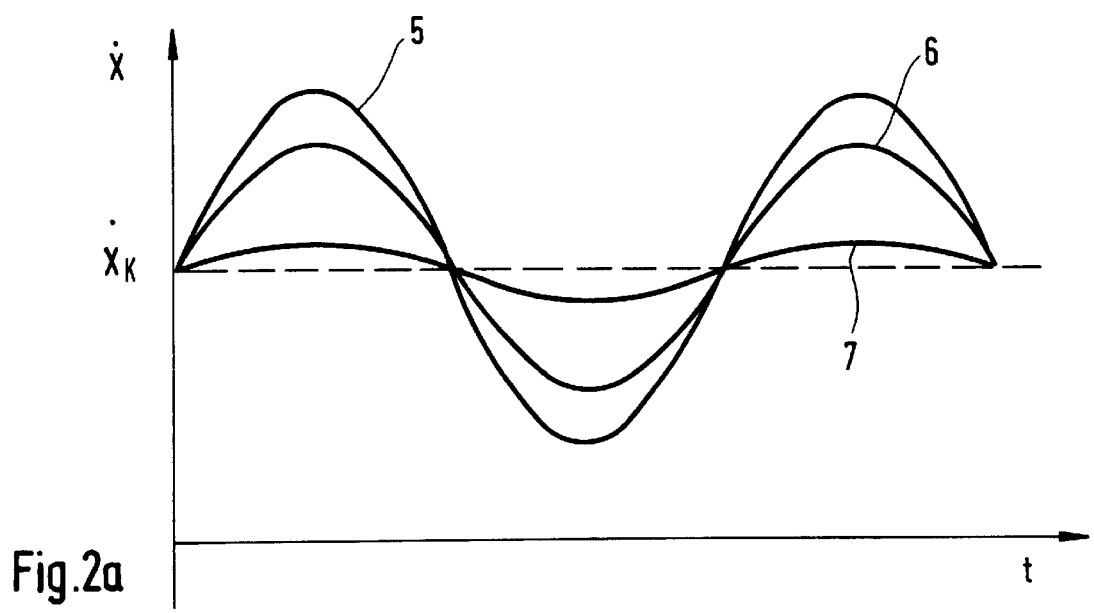
FIG. 2 speed and acceleration profiles detectable by the control of FIG. 1 and evaluated for generating motor drive control signals.

FIG. 4 shows how speed profiles, as those shown in FIG. 2a, result from, for example, a bicycle driven by a muscle power drive with constant average speed.

Figure 4A:
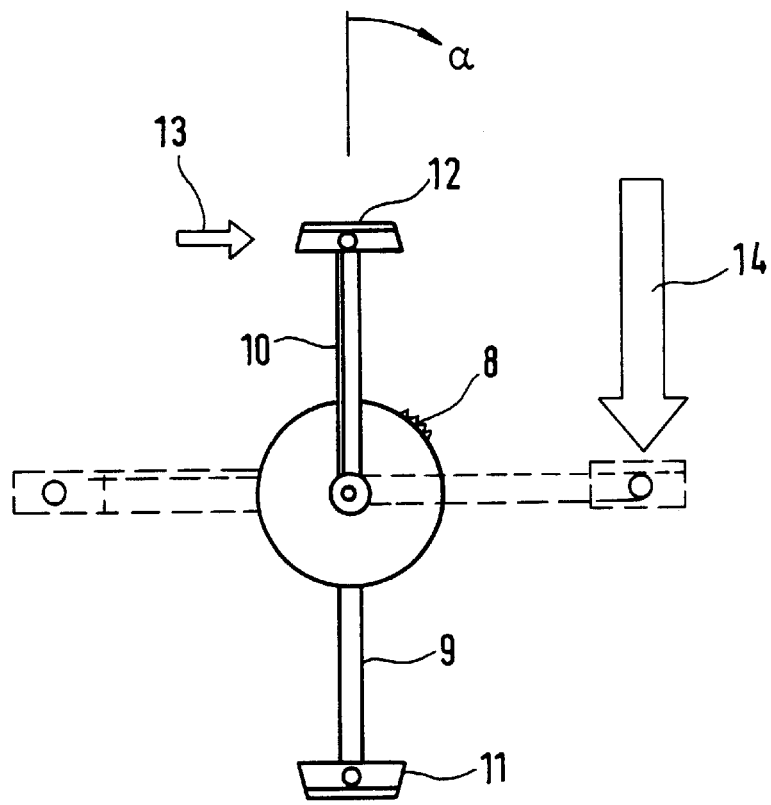
FIG. 4 a representation explaining the formation of the profiles of FIGS. 2 and 3.

FIG. 4a shows the bicycle pedal cranks 9 and 10 each having a pedal 11 and 12 and being connected to the chain drive wheel 8. An arrow is shown at 13 illustrating a tangential driving power exerted in the vertical position of the pedal cranks. The arrow 14 indicates the tangential driving power in the horizontal position of the pedal cranks. As indicated by the different sizes of the arrows 13 and 14, in the vertical pedal crank position a substantially reduced tangential driving power $P_T$ is exerted as compared to the horizontal rotational position of the pedal cranks 9 and 10, wherein the tangential driving power $P_T$ has approximately the periodic course illustrated in FIG. 4b as a function of the rotational angle $\alpha$ of the crank drive wheel 8.

Figure 2B:
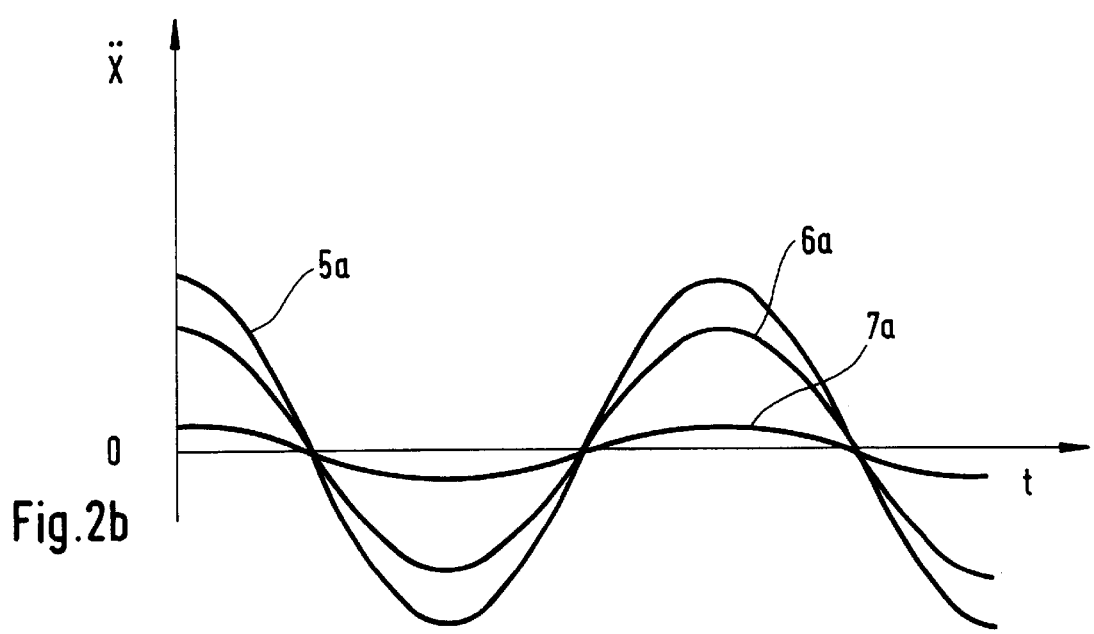

According to this periodic course of the tangential driving power $P_T$, the acceleration profiles 5a to 7a illustrated in FIG. 2b result for the bicycle driven by means of the pedal cranks 9 and 10. By integration over time the speed profiles 5 through 7 of FIG. 2a result.

Figure 4B:
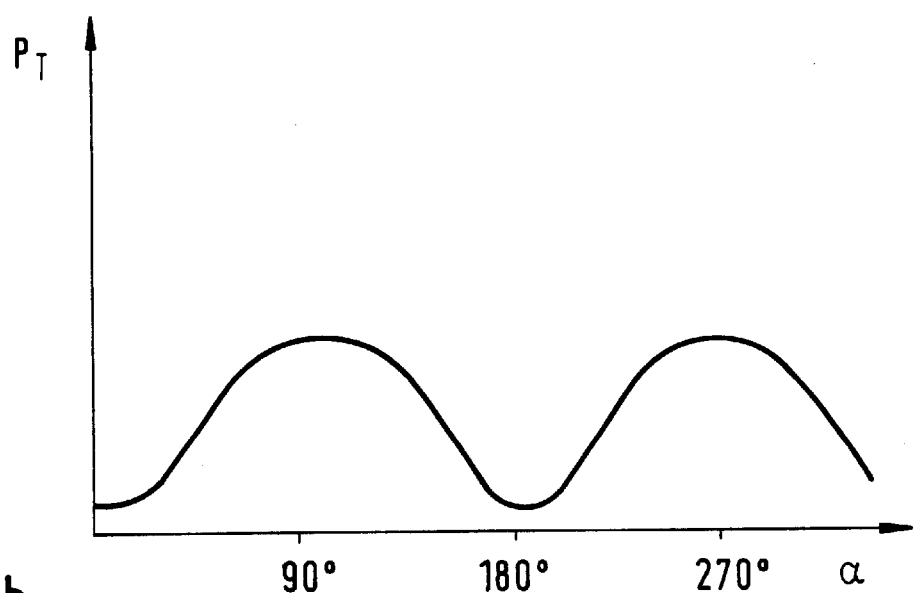

Because of the proportional relation between the driving power and the acceleration, the amplitudes of the periodic profile components are the greater the greater the average tangential driving power according to FIG. 4b is. When there is no muscle power load, i.e., when the bicyclist does not pedal or pedals along without load, the periodic component of the speed profile will disappear.

When driving a drivable device by a running movement and exertion of a pulling or pushing force, profiles similar to the profiles of FIG. 2 result because of the varying force transmission conditions of the step movement. The amplitudes of these profiles also increase with increasing average muscle driving load, and the periodic profile component disappears when, for example, the pulling rod of a golf cart is only held without transmission of a pulling force or a (decelerating) pushing force.

The control signal generating device 3 illustrated in FIG. 1 comprises in the shown embodiment a differential device by which, based on the speed profiles shown in FIG. 2a, the acceleration profiles shown in FIG. 2b can be computed.

The profiles shown in FIG. 2 may result, for example, for a movement overcoming a constant incline or/and a movement in which the driving power and a frictional resistance, for example, air resistance, are balanced.

Figure 3A:
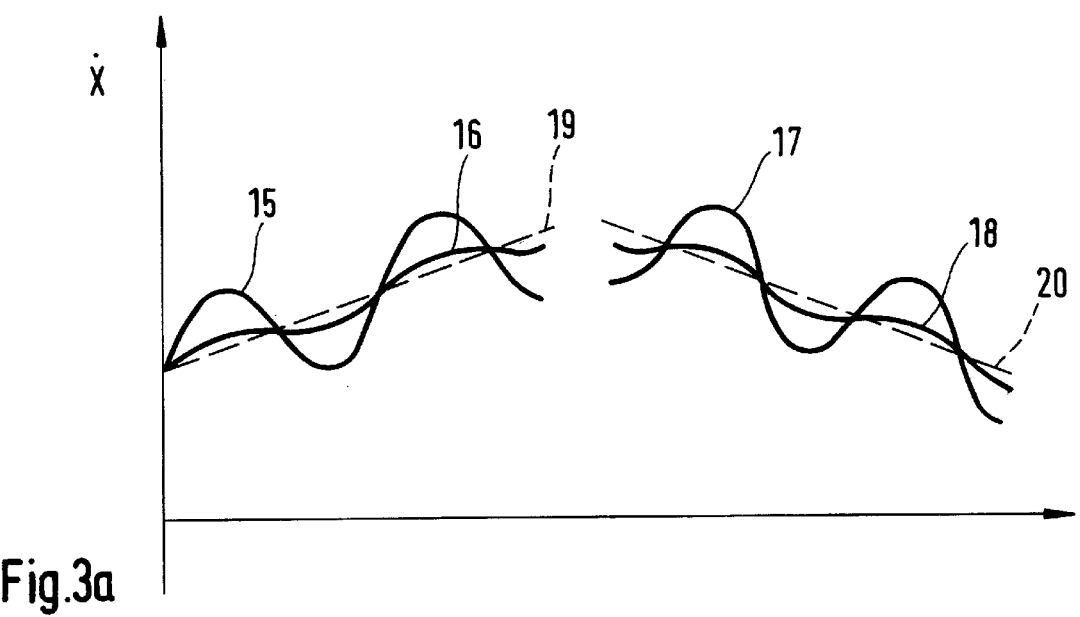
FIG. 3 further speed and acceleration profiles that can be evaluated by the control of FIG. 1 according to the invention.
Figure 3B:
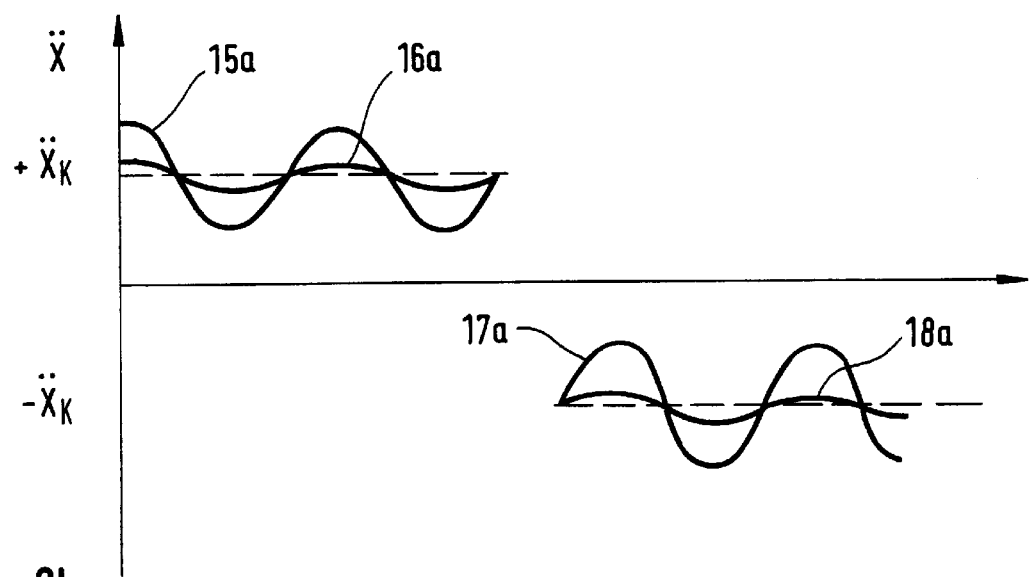

Reference is now being had to FIG. 3 showing speed and acceleration profiles for a movement that (on average) is uniformly accelerated or decelerated.

Also, in the case of such an accelerated movement with constant basic acceleration $X_K$ speed profiles 15, 16 and acceleration profiles 15a, 16a result, each having a periodic component that is overlaid on a uniformly increasing average speed or the constant acceleration $X_K$.

Speed profiles are indicated in FIG. 3a at 17 and 18 which result for a uniformly decelerated movement. Such a movement could be generated by a braking running movement of a person resulting in braking a drivable device that has been previously pulled by the person. The acceleration profiles corresponding to the speed profiles 17 and 18 are indicated by 17a and 18a whose periodic component is overlaid onto a constant negative acceleration $-X_K$.

In the following the function of the control, explained with the aid of FIGS. 1 through 4, is described.

During the movement of a drivable device comprising the control devices of FIG. 1, the device 4 for detecting speeds provides constantly detected speed values according to the profiles of FIGS. 2a or/and 3a to the signal generating device 3.

In the shown embodiment the signal generating device 3 evaluates these profiles by comparing the amplitudes of the periodic component of the speed profiles or/and acceleration profiles determined by differentiating with a stored amplitude value which corresponds to the basic load of the drive action of the drivable device to be supplied by muscle power.

The signal generating device 3 generates then control signals such that the amplitude of the periodic components of the sensed speed or acceleration profiles is adjusted to the stored amplitude. This means that the motor driving power is increased or decreased resulting in relief of the supplied muscle driving power such that the exerted muscle driving power corresponds to a speed profile whose amplitude is identical to the stored amplitude value. In the context of this adjustment it would also be possible to employ average values $X_K$, $-X_K$ for the evaluation in order to, for example, determine whether a movement that, on average, is accelerated or decelerated is present. Accordingly, the motor exerts from the start a braking force for a negative acceleration.

In contrast to a control adjustment of the amplitude, i.e., of individual values of the profile, it would also be possible to provide a control based on further profile values or a control based on stored total speed and/or acceleration profiles which correspond to a predetermined basic load to be supplied by the muscle drive action.

Instead of a control to predetermined amplitudes or profiles it is also possible to provide a motor control such that a detected periodic component, which indicates the presence of a muscle driving power, is made to disappear. This means that in this case the motor takes over the complete drive output after initial or intermediate muscle power drive.

A third possibility is to control the motor such that a measured amplitude is reduced by a certain percentage so that it is ensured that the motor in any drive situation provides a predetermined, optionally adjustable, percentage of the total required drive output. In this context, the control could be provided with a device which detects the current motor driving power based on the kinematic evaluation of the movement of the driven device or of the motor drive itself and based on a detection of all voltages supplied to the motor drive and/or currents flowing therethrough.

Figure 5A:
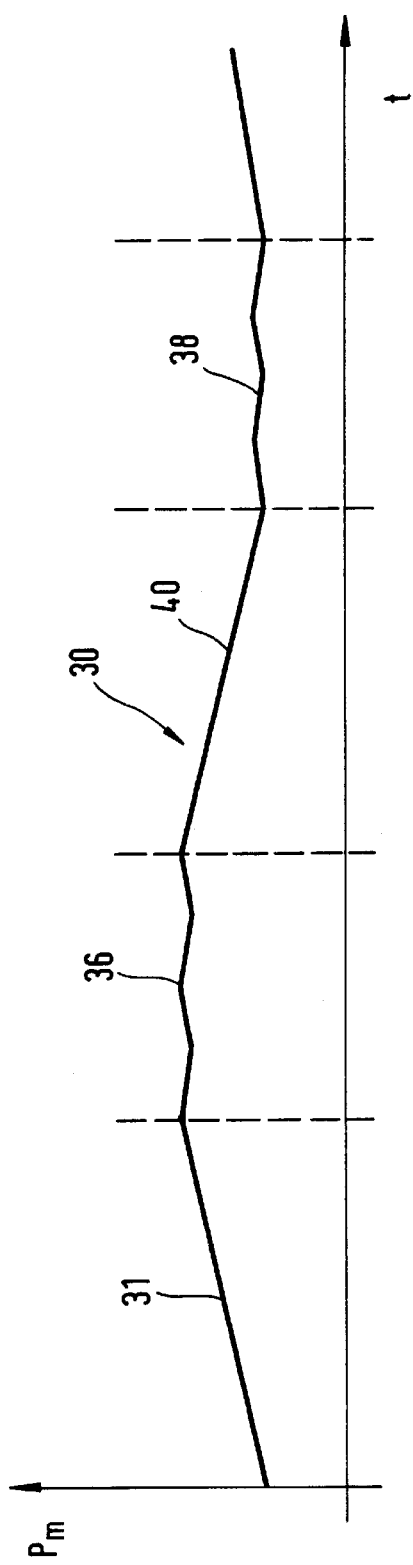
FIG. 5 a diagram for explaining one embodiment of the control according to the invention.

Reference is now being had to FIG. 5 wherein the reference numeral 30 indicates a time function of the motor driving power $P_m$ in partial Figure a. In one operational mode of the control it is proposed that the driving power $P_m$ increases slowly as previously in the portion 31 of the aforementioned time function.

Figure 5B:
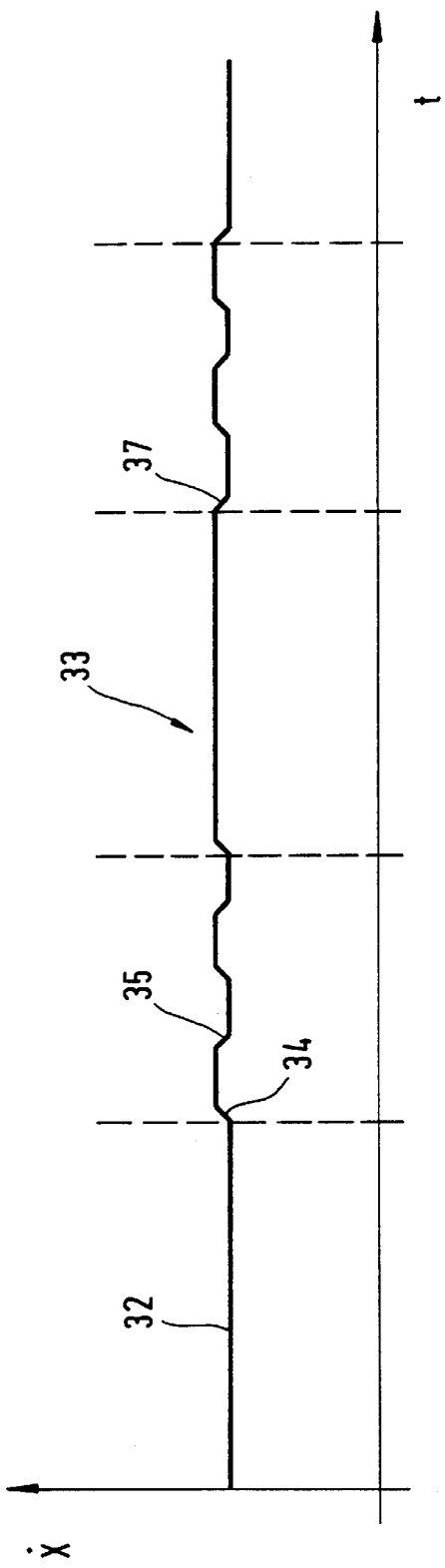

When a behavior model is used, according to which a user of the drivable device reduces the muscle driving power in the same amount as the motor driving power increases, as long as he desires a stronger support by the motor drive, the speed $\dot{x}$ remains constant according to the portion 32 of the speed-time-function 33 illustrated in partial FIG. 5b.

When the user reduces the driving power no longer in the amount of the increase of the motor driving power, an acceleration of the movement results at the location 34. The registration of this acceleration in the aforementioned operational mode causes the driving power $P_m$ of the drive motor to now be reduced slowly. However, since the user desires a motor driving power, that is present at the point of acceleration, as a driving support, upon decrease of the motor driving power he will not increase the muscle driving power for very long in accordance with the decrease so that at 35 a negative acceleration results which is the cause of a further increase of the motor driving power. Accordingly, on average a constant amount of provided muscle driving power is maintained in the phase 36 of the driving power-time-function. In a subsequent phase 40, the user increases according to the decrease of the driving power $P_m$ his driving power until the phase 38 of the driving power-time-function begins. At this point, this increase no longer occurs so that at 37 a negative acceleration results. In the phase 38, as in the phase 36, the muscle driving power remains again approximately constant in that the user will counteract sequentially occurring changes of the increase direction of the motor driving power only for short periods of time by corresponding changes of the muscle driving power. In the described manner the motor drive is adjusted automatically to the basic load of the muscle power drive desired by the user and varying over the course of time.

What is claimed is:

1. Control for a motor drive of a device that is moved by a muscle power drive as well as, in a supporting function, the motor drive, comprising an apparatus, detecting kinematic parameters of the moving device and generating motor drive control signals, for adjusting a degree of support action for the muscle power drive by means of the motor drive based exclusively on the detected kinematic parameters, wherein the kinematic parameters relate to a component of the movement of the entire device which is based on at least one of the periodic fluctuation of the exerted muscle driving power inherent in the muscle power drive and a change of the exerted muscle driving power in reaction to a certain change of the motor driving power or the motor driving speed.

2. Control according to claim 1, wherein the aforementioned apparatus (3, 4) is provided for determining time functions (5–7; 15–18) of the kinematic parameters.

3. Control according to claim 2, wherein that the aforementioned apparatus (3, 4) comprises an analysis device for evaluating the time functions.

4. Control according to claim 3, wherein the analysis device comprises a differential device.

5. Control according to claim 1,
wherein the aforementioned apparatus is provided for determining periodic time functions of at least one of the speed and acceleration.

6. Control according to claim 5,
wherein the aforementioned apparatus (3, 4) is provided for determining the amplitude of the periodic time functions.

7. Control according to claim 5, wherein the aforementioned apparatus is provided for comparing the determined time function with a predetermined target function, for controlling the determined time function with respect to the target function by a corresponding change of the motor driving power.

8. Control according to claim 5,
wherein the aforementioned apparatus is moreover provided for determining at least one of the average speed (19, 20) and acceleration over the periodic time function.

9. Control according to claim 1,
wherein as a directed change of the motor driving power or speed, a slow increase or a slow decrease of the motor driving power or speed is provided and the aforementioned apparatus is provided for switching from increase to decrease upon detecting a deceleration and from decrease to increase upon detecting an acceleration of the device.

10. Control according to claim 1,
wherein a multi-pole drive motor is provided as a rotational angle pulse generator for a speed measuring device.

11. Control according to claim 5, wherein the aforementioned apparatus is provided for comparing the determined amplitude with a target amplitude, and for controlling the determined amplitude with respect to the target amplitude by a corresponding change of the motor driving power.

* * * * *